(12) United States Patent
Cherian et al.

(10) Patent No.: US 6,627,243 B2
(45) Date of Patent: Sep. 30, 2003

(54) CREAM SUBSTITUTE

(75) Inventors: George Cherian, Lewisville, TX (US); Mark Randolph Jacobson, New Milford, CT (US); Dharam Vir Vadehra, New Milford, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/756,930

(22) Filed: Jan. 10, 2001

(65) Prior Publication Data

US 2001/0003598 A1 Jun. 14, 2001

Related U.S. Application Data

(63) Continuation-in-part of application No. 09/143,664, filed on Aug. 31, 1998, now abandoned.

(51) Int. Cl.$^7$ ................................................. A23C 13/00
(52) U.S. Cl. ....................... 426/586; 426/581; 426/573; 426/578; 426/575
(58) Field of Search ................................ 426/581, 530, 426/578, 573, 586, 589

(56) References Cited

U.S. PATENT DOCUMENTS

| | | | | |
|---|---|---|---|---|
| 3,314,798 A | | 4/1967 | Graves | 426/586 |
| 4,146,652 A | * | 3/1979 | Kahn et al. | 426/553 |
| 4,251,560 A | | 2/1981 | Dell | 426/570 |
| 4,307,125 A | | 12/1981 | Amer | 426/586 |
| 4,310,561 A | | 1/1982 | Buddemeyer | 426/601 |
| 4,436,760 A | | 3/1984 | Verhagen | 426/603 |
| 4,451,492 A | | 5/1984 | Dell | 426/564 |
| 4,505,943 A | * | 3/1985 | Dell et al. | 426/565 |
| 4,772,483 A | * | 9/1988 | Nolte | 426/392 |
| 4,820,541 A | | 4/1989 | Harenz | 426/586 |
| 4,873,094 A | | 10/1989 | Pischke | 426/586 |
| 4,985,270 A | | 1/1991 | Singer | 426/572 |
| 5,149,559 A | | 9/1992 | Alaers | 426/586 |
| 5,352,474 A | | 10/1994 | Lammers | 426/568 |
| 5,480,670 A | | 1/1996 | Pordy | 426/586 |
| 5,494,694 A | | 2/1996 | Herrmann | 426/586 |
| 5,939,126 A | | 8/1999 | Flynn | 426/586 |

FOREIGN PATENT DOCUMENTS

| | | |
|---|---|---|
| EP | 0 714 609 A2 | 6/1996 |
| GB | 1 066 703 | 4/1967 |
| GB | 1 077 338 | 7/1967 |

OTHER PUBLICATIONS

Rombauer, I. S. 1975. Joy of Cooking. Penguin Putman, Inc., New York, NY. p. 532.*

Rombauer et al., "The All Purpose Cookbook," Joy of Cooking Plume, New York p. 532, 1997.

* cited by examiner

*Primary Examiner*—Carolyn Paden
(74) *Attorney, Agent, or Firm*—Winston & Strawn

(57) ABSTRACT

A cream substitute comprising from 5% to 40% by weight of butter, from about 0.25% to about 5% by weight of a thickening agent, and about 0.25% to about 4% of a food protein, based on the total weight of the cream substitute, together with a sufficient amount of water to total 100% by weight, and, optionally, from about 0.05% to about 2% by weight of a food acceptable acid.

18 Claims, No Drawings

CREAM SUBSTITUTE

CROSS REFERENCE TO RELATED APPLICATIONS

This is a continuation-in-part of application Ser. No. 09/143,664 filed Aug. 31, 1998 now abandoned.

FIELD OF THE INVENTION

The present invention relates to a cream substitute, especially one which can be used in food products normally containing cream, to methods of making the cream substitute and to various foodstuffs prepared with the cream substitute in place of some or all of the cream such foodstuffs typically are prepared with.

BACKGROUND OF THE INVENTION

Cream substitutes are known which may be added to other ingredients of food products normally containing cream such as culinary products, e.g., sauces, gravies, soups, etc. or cream-containing desserts, e.g., cream-filled pastries, etc. Some of these cream substitutes contain gelatin to provide texture and/or as a stabilizer but the use of gelatin is undesirable not only because of concerns about bovine spongiform encephalopathy (i.e., "BSE" or "mad-cow disease"), but also for the vegetarian population, as well as for certain ethnic groups who have concerns about the nature of meat used in certain food products and/or who observe certain dietary constraints concerning the consumption of meat and dairy products.

U.S. Pat. No. 4,146,652 discloses an intermediate moisture food that remains stable at freezer temperatures. The foods include oil-in-water emulsions, butter creams, whipped toppings, low-fat whipped creams, milk mates, non-dairy shakes, icings, and coffee creamers. The foods have a water activity of from about 0.75 to 0.9 and a sugar to water ratio of at least 1:1 and a sugar content that is at least 5% dextrose and/or fructose.

GB 1,066,703 discloses an imitation cream concentrate comprising 40 to 70% fat, 20 to 50% water, 10 to 40% of one or more sugars, whole milk powder, separated milk powder, and/or one or more starch derivatives and at least three whipping/emulsifying agents at least one being selected from each of the following groups: (i) whipping/emulsifying agents that have a strong affinity for the water/air interface, (ii) emulsifying agents which have a strong affinity for the water/fat interface, and (iii) lipophilic emulsifying agents.

EP 0 714 609 discloses a cream-like composition that comprises 16 to 40% of an oil and fat and 0.3 to 6% by weight of a protein being admixed with water containing sugar materials and the like brought into emulsification to a total solids content of 35 to 70% by weight.

GB 1,077,338 discloses an edible whipping composition comprising a first spray dried component which is a spray dried mixture of an edible fat, a sweetener, a water soluble protein, and a coating agent which is a water soluble gum or milk solid and a second component which is a spray dried mixture of a water soluble gum and an acidic stiffening agent. The fat or fat mixture is present in an amount of 30 to 75%, the sweetener in an amount of 10 to 60%, the water soluble protein in an amount of 7 to 12%, the gum in the first component in an amount of 2 to 10%, the gum in the second component in an amount of 80 to 95%, and the stiffening agent in an amount of 5 to 20%.

SUMMARY OF THE INVENTION

We have developed a cream substitute which does not contain gelatin, which is stable to heat, high acid (i.e., pH≦5) and alcohol (e.g., wine, liquor, etc.), which gives a high yield, and which has superior emulsifying properties when compared with known cream substitutes.

According to the present invention, there is provided a cream substitute comprising from about 5% to about 40% by weight of butter, from about 0.25% to about 5% by weight of a thickening agent, and from about 0.25% to about 4% by weight of a food protein based on the total weight of the cream substitute, together with water in an amount of about 45 to about 90 wt % by weight. Optionally, the cream substitute includes from about 0.05% to about 2% by weight of a food acceptable acid.

The butter may be present in an amount of about 15% to about 35% by weight based on the total weight of the cream substitute.

The food acceptable acid may be lactic acid, citric acid, sorbic acid, benzoic acid, propionic acid, acetic acid malic acid, fumaric acid, tartaric acid, succinic acid, salts thereof, or a mixture thereof. The food acceptable acid may be present in an amount of about 0.05% to about 1.5% by weight based on the total weight of the cream substitute.

The thickening agent may be a starch or any food acceptable gum. The food acceptable gum may be xanthan gum, guar gum, gum arabic, carrageenan, gellan gum, locust bean gum, gum ghatti, gum tragacanth, agar, algin, sodium alginate, potassium alginate, propylene glycol alginate, or a mixture thereof.

The thickening agent may be present in an amount of about 0.25% to 4% by weight based on the total weight of the cream substitute.

The food protein may be soy, rice, pea, and milk protein. The food protein may be a dairy protein. The dairy protein may be whey protein concentrate, whey protein isolate, or casein. The food protein may be present in an amount of about 0.25% to about 2% by weight based on the total weight of the cream substitute.

The water may be present in an amount of about 67% to about 80% by weight based on the total weight of the cream substitute. In one embodiment the cream substitute is sugar free.

The invention further relates to a process of preparing the cream substitute. The process involves combining the thickening agent and protein with water to form a first mixture, combining the first mixture with the butter to form a second mixture, optionally adding the food acceptable acid to the second mixture, blending the second mixture, and homogenizing the second mixture. Alternatively, the process may involve melting the butter; combining the melted butter with the optional food acceptable acid, the thickening agent, and the protein to form a mixture; and blending the mixture with water. The mixture may be agitated during the blending step. The process may further involve refrigerating, dehydrating, pasteurizing, retorting, or canning the cream substitute.

The invention also relates to a foodstuff that contains the cream substitute of the invention. The amount of cream substitute present in the foodstuff may be about 1% to about 80% by weight based on the weight of the foodstuff.

DETAILED DESCRIPTION OF THE INVENTION

The amount of butter in the cream substitute of the invention is preferably from about 15% to about 35%, and more preferably from about 20% to about 30% by weight based on the weight of the cream substitute.

Optionally, an organic acid or inorganic acid (or their salts), or mixtures thereof, can be added to inhibit yeast and mold growth and improve shelf life.

Any acid commonly acceptable in the food preparation field for use with food, i.e., referred to herein as a "food acceptable acid", may be used to reduce the pH and to impart microbiological stability as well as other functionalities, depending upon the acid chosen. Any acid available to those of ordinary skill in the art may be used. For example, lactic acid, citric acid, sorbic acid, benzoic acid, propionic acid, acetic acid, malic acid, fumaric acid, tartaric acid, succinic acid, and salts thereof or any mixture of such acids may be used. The amount of such acid included in the cream substitute depends on the desired shelf life, but is typically from about 0.05% to about 2% by weight and preferably from about 0.05% to about 0.5% by weight based on the total weight of the cream substitute. Too much acid creates an acidic off-flavor, too little acid reduces shelf life. When aseptic processing is used, however, the addition of acid is not needed.

The thickening agent may be a suitable starch including modified and unmodified starches, depending upon the desired functionality of the material, e.g., its viscosity, heat resistance, shear resistance, the amount of retorting and the like it will undergo, or any gum acceptable for use with food, i.e., referred to herein as a "food acceptable gum", e.g., xanthan gum, guar gum, gum arabic, carrageenan, gellan gum, locust bean gum, gum ghatti, gum tragacanth, agar, algin, sodium alginate, potassium alginate or propylene glycol alginate, or any mixture thereof. The amount of thickening agent may be from about 0.25% to about 5% by weight and preferably from about 1% to about 3% by weight based on the total weight of the cream substitute. The thickening agent is added for texture and stability. Less thickening agent results in a product that is less stable and a product with reduced yield. Too much thickening agent results in a product that is organoleptically too thick and which is difficult to process.

The protein component, which may include, but is not limited to soy, rice, pea and/or milk protein, is preferably a dairy protein such as whey protein concentrate or isolate, casein in its various forms, e.g., acid casein, rennet casein, or sodium, potassium or calcium caseinate. The amount of protein used may be varied according to the nature and concentration of the protein contained in the components of the cream substitute, as well as in the functionalities desired for the product during its initial processing and final use. These proteins, and the useful amounts thereof, would be readily determinable by one of ordinary skill in the food art without the need for any undue experimentation. Preferably, the amount of protein used varies from about 0.25 to about 4 wt % and more preferably between about 0.25 and about 2 wt %. The protein helps to form a stabilized emulsion. Less protein results in a loss of capacity to form a stable emulsion. More protein results in a product that shows heat instability and acid instability.

The cream substitute of the invention may be prepared by mixing the solid ingredients with water, e.g., at a temperature of from about 120° F. to 200° F. (49° C. to 93° C.), preferably with agitation. The butter is then added and the pH is adjusted. The resulting mixture is preferably homogenized by various means familiar to those of ordinary skill in the art, e.g., with a homogenizer, a colloid mill, etc.

The water is present in an amount to total 100 wt %. The amount of water is typically between about 45 and about 90 wt %, preferably between about 50 and about 85 wt %, more preferably between about 67 and about 80 wt %, most preferably between about 70 and about 75 wt %.

The cream substitute may be refrigerated, frozen, dehydrated, pasteurized, retorted, or canned. The pasteurization may be carried out under conditions that are well known to those of ordinary skill in the art, for example, by heating to 185° F. for 30 seconds. Aseptic sterilization may be carried out by a high temperature/short time ("HTST") technique, which is well known to those of ordinary skill in this art, e.g., at 282° F. (139° C.) for 10 seconds. The cream substitute normally has a viscosity that enables it to be spoonable at room temperature.

The cream substitute of the invention may be used in food products normally containing cream and/or butter or margarine as well as a fat or oil in an emulsified form, such as culinary products, e.g., sauce, gravy or soup, in desserts, e.g., cream-filled pastry, in drinks, as a component of salad dressings, particularly the so-called "creamy dressings", as well as fillings in pies, crepes and "pockets". These products are collectively referred to herein as "foodstuffs".

The present invention therefore is also directed to a "foodstuff" comprising a cream substitute of the present invention. The cream substitute of the present invention may replace some or preferably all of the cream that is normally present in such a foodstuff.

The amount of cream substitute present in the foodstuff may be from 1% to 80% by weight, preferably from 5% to 45% by weight and more preferably from 10% to 40% by weight based on the weight of the foodstuff.

The cream substitute of the present invention is stable in the presence of acids and alcohol, e.g., some products contain lemon juice or wine. It is also heat stable, that is, there is no coagulation or scorching on boiling and a skin or film does not readily form on the surface of the food product. In addition, the cream substitute of the present invention is an excellent emulsifier, e.g. it is capable of emulsifying three times its own weight in butter and it does not destabilize when moisture is released by frozen or fresh foods during baking, broiling, etc.

Additional ingredients that would enhance the flavor of the product may optionally be added. Optional ingredients may include, but are not limited to, sweeteners, such as sucrose, fructose, lactose, maltodextrins, and artificial sweeteners in amounts up to about 5 percent by weight; flavorants, such as cream flavor, butter flavor, milk flavor, or any other dairy flavors in amounts up to about 3 percent by weight.

EXAMPLES

The following Examples further illustrate the present invention but are not to be construed as limiting the invention in any manner. The percentages given are by weight unless otherwise noted.

Example 1

A cream substitute according to the invention is prepared by blending the following ingredients in the manner described below:

| | |
|---|---|
| butter | 24% |
| citric acid | 0.1% |
| xanthan gum | 0.5% |
| guar gum | 0.2% |
| potassium sorbate (an antimicrobial agent) | 0.2% |
| whey protein concentrate (80% protein) | 1.0% |
| sodium caseinate | 0.75% |
| water | balance to 100% |

To prepare the cream substitute, the gum component and the protein component are mixed for five (5) minutes in water at approximately 150° F., followed by the addition of the potassium sorbate and the citric acid. The mixture is then stirred for three (3) minutes, after which the butter is added and allowed to melt, followed by mixing for seven (7) additional minutes. The mixture is then homogenized in a two stage homogenizer (2,000/500 psi) and pasteurized at 185° F. for 30 seconds. The product is thereafter cooled to 40° F. and packaged.

When used at room temperature, the cream substitute is spoonable, stable to acid and heat and has excellent emulsifying properties which are superior to cream substitutes containing gelatin.

Example 2

Another cream substitute according to the invention is prepared by blending the following ingredients in the manner described in Example 1:

| | |
|---|---|
| butter | 25% |
| potassium sorbate | 0.2% |
| citric acid | 0.1% |
| xanthan gum | 0.7% |
| guar gum | 0.25% |
| whey protein concentrate (80% protein) | 0.6% |
| diglyceride of tartrate (emulsifier) | 0.3% |
| water | balance to 100% |

The cream substitute produced according to Example 2 has properties identical to those of Example 1.

Example 3

Still another cream substitute according to the invention is formed by blending the following ingredients in the manner described in Example 1:

| | |
|---|---|
| butter | 25% |
| potassium sorbate | 0.2% |
| citric acid | 0.1% |
| xanthan gum | 0.7% |
| guar gum | 0.3% |
| rennet casein | 0.8% |
| water | balance to 100% |

The cream substitute according to the example had properties in keeping with those described for the substitutes prepared according to Examples 1 and 2.

Example 4

This example illustrates a food product, i.e., Fiesta Alfredo Sauce, containing the cream substitute described in Example 1:

| | |
|---|---|
| vegetable oil | ½ cup |
| chopped garlic | 2 tablespoons |
| green onion | 1 cup |
| sliced white mushroom | 1¼ cup |
| sliced oyster mushroom | 1¾ cup |
| spinach | 1½ cup |
| white wine | ½ cup |
| basil | 2 tablespoons |
| diced tomato | 3 cups |
| cream substitute of Example 1 | 5 pounds |
| parmesan cheese | 1¼ cup |
| chicken base (concentrate) | 2 tablespoons |

The ingredients are blended in the order given to provide a sauce which can be served over pasta, rice, meat or seafood.

We claim:

1. A cream substitute comprising about 5% to about 40% by weight of butter, from about 0.25% to about 5% by weight of a thickening agent of a starch or food acceptable gum, and from about 0.25% to about 4% by weight of a food protein based on the total weight of the cream substitute, together with water in an amount of about 50 to about 90% by weight, and, optionally, a food acceptable acid in an amount of about 0.05% to about 2% by weight.

2. The cream substitute of claim 1, wherein the butter is present in an amount of about 15% to about 35% by weight, based on the total weight of the cream substitute.

3. The cream substitute of claim 1, wherein the food acceptable acid is selected from the group consisting of lactic acid, citric acid, sorbic acid, benzoic acid, propionic acid, acetic acid, malic acid, fumaric acid, tartaric acid, succinic acid, salts thereof, and mixtures thereof.

4. The cream substitute of claim 1, wherein the food acceptable acid is present in an amount of about 0.05% to about 1.5% by weight based on the total weight of the cream substitute.

5. The cream substitute of claim 1, wherein the thickening agent is present in an amount of about 0.25% to 4% by weight based on the total weight of the cream substitute.

6. The cream substitute of claim 1, wherein the food protein is selected from the group consisting of soy, rice, pea, and milk protein.

7. The cream substitute of claim 1, wherein the food protein is a dairy protein.

8. The cream substitute of claim 7, wherein said dairy protein is selected from the group consisting of whey protein concentrate, whey protein isolate, and casein.

9. The cream substitute of claim 1, wherein the food protein is present in an amount of about 0.25% to about 2% by weight based on the total weight of the cream substitute.

10. The cream substitute of claim 1, wherein the water is present in an amount of about 67% to about 80% by weight based on the total weight of the cream substitute.

11. A process of preparing a cream substitute according to claim 1 which comprises: combining the thickening agent and protein with water to form a first mixture, combining the first mixture with the butter to form a second mixture, optionally adding the food acceptable acid to the second mixture, blending the second mixture, and homogenizing the second mixture.

12. The process of claim 11, further comprising agitating the mixture during the blending step.

13. The process of claim 11, further comprising refrigerating, dehydrating, pasteurizing, retorting, or canning the cream substitute.

14. A process of preparing a cream substitute according to claim 1 which comprises: melting the butter; combining the melted butter with the food acceptable acid, the thickening agent, and the protein to form a mixture; and blending the mixture with water.

15. A foodstuff comprising the cream substitute of claim 1.

16. The foodstuff of claim 15, wherein the amount of cream substitute present therein is about 1% to about 80% by weight based on the weight of the foodstuff.

17. A cream substitute comprising about 5% to about 40% by weight of butter, from about 0.25% to about 5% by weight of a thickening agent, and from about 0.25% to about 4% by weight of a food protein based on the total weight of the cream substitute, together with water in an amount of about 50 to about 90% by weight, and, optionally, a food acceptable acid in an amount of about 0.05% to about 2% by weight, wherein the thickening agent is a food acceptable gum selected from the group consisting of xanthan gum, guar gum, gum arabic, carrageenan, gellan gum, locust bean gum, gum ghatti, gum tragacanth, agar, algin, sodium alginate, potassium alginate, propylene glycol alginate and mixtures thereof.

18. A cream substitute consisting essentially of from about 5% to about 40% by weight of butter, from about 0.25% to about 5% by weight of a thickening agent, and from about 0.25% to about 4% by weight of a food protein based on the total weight of the cream substitute, together with water in an amount of about 45 to about 90 wt % by weight, and, optionally, from about 0.05% to about 2% by weight of a food acceptable acid.

* * * * *